Figure 1:
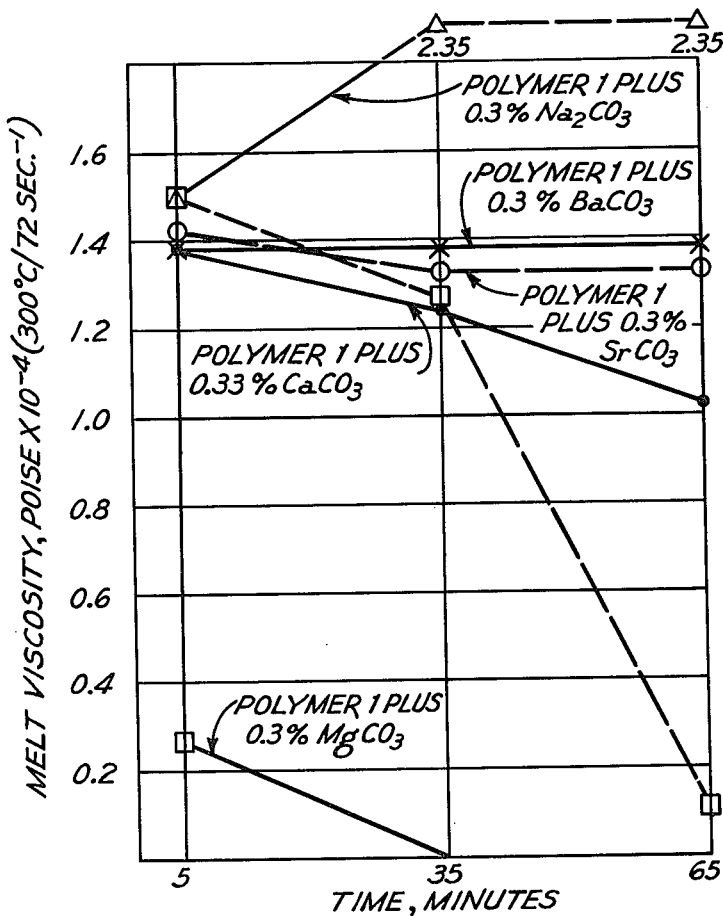

United States Patent [19]

Cleveland et al.

[11] 4,097,547

[45] Jun. 27, 1978

[54] STABILIZED POLYCARBONATES

[75] Inventors: Thomas H. Cleveland; John V. Bailey, both of New Martinsville, W. Va.

[73] Assignee: Mobay Chemical Corporation, Pittsburgh, Pa.

[21] Appl. No.: 318,323

[22] Filed: Dec. 26, 1972

Related U.S. Application Data

[60] Division of Ser. No. 165,300, Jul. 22, 1971, Pat. No. 3,733,296, which is a continuation-in-part of Ser. No. 342, Jan. 2, 1970, abandoned.

[51] Int. Cl.² ................................................. C08K 3/26
[52] U.S. Cl. ............................... 260/860; 260/45.7 R; 260/47 XA
[58] Field of Search ................................. 260/45.7 R

[56] References Cited

U.S. PATENT DOCUMENTS

| | | | |
|---|---|---|---|
| 2,075,251 | 3/1937 | Winkelmann | 260/45.7 |
| 2,365,400 | 12/1944 | Fikentscher | 260/45.9 |
| 2,555,167 | 5/1951 | Van Dijk et al. | 260/45.9 |
| 2,745,819 | 5/1956 | Mack et al. | 260/45.75 |
| 3,021,303 | 2/1962 | Jibben | 260/45.75 |
| 3,274,156 | 9/1966 | Perry et al. | 260/47 |
| 3,334,154 | 8/1967 | Kim | 260/860 |
| 3,575,927 | 4/1971 | Jackson, Jr. et al. | 260/47 |
| 3,647,747 | 3/1972 | Bialous | 260/45.75 |

OTHER PUBLICATIONS

Rose et al., "The Condensed Chemical Dictionary", 1966, p. 31.

*Primary Examiner*—Donald E. Czaja
*Assistant Examiner*—R. A. White
*Attorney, Agent, or Firm*—Gene Harsh; Lawrence S. Pope

[57] ABSTRACT

Halogenated polycarbonate polymeric materials containing an effective amount of barium carbonate, strontium carbonate and/or calcium carbonate to stabilize the polymer.

12 Claims, 6 Drawing Figures

PNPP = PHENYL NEOPENTYL PHOSPHITE

DIPD = DI-ISODECYL PENTAERYTHRITYL DIPHOSPHITE

PNPP = PHENYL NEOPENTYL PHOSPHITE

STABILIZED POLYCARBONATES

This is a division of application Ser. No. 165,300 filed July 22, 1971, now U.S. Pat. No. 3,733,296, and which is a continuation-in-part application of application Ser. No. 000,342, filed Jan. 2, 1970, now abandoned.

Aromatic carbonate polymers are well known, commerically available materials having a variety of applications in the plastics art. Such carbonate polymers may be prepared by reacting a dihydric phenol, such as 2,2-bis(4-hydroxyphenyl)-propane, (bisphenol-A) with a carbonate precursor such as phosgene, in the presence of an acid binding agent. Polycarbonate polymeric materials have been found to be generally advantageous in the production of fibers, films, foils and molded structures generally because they offer a high resistance to the attack of mineral acid, they are easily molded and physiologically harmless as well as being stain resistant. Polycarbonate polymeric materials possess excellent physical and mechanical properties including high tensile and impact strength, high heat resistance and dimensional stability which far surpasses that of any other thermoplastic. In addition, polycarbonate resins are generally considered to be self-extinguishing, i.e. they extinguish within about 20 seconds after the removal of a contacting flame. Notwithstanding, however, there remain several commercial applications in which the thermal resistance of the polymer must exceed the above described self-extinguishing classification while still retaining its excellent physical and mechanical properties.

In order to provide a polycarbonate having improved flame resistance it has been proposed to use as additives inorganic flame retardants such as antimony oxide. It has been found, however, that such additives excessively degrade the polycarbonate during molding operations as do other types of additives containing halogen atoms and so on. Further, gross quantities of such additives must be employed and even then their effect is not sufficient to improve the resistance of the polymer to high ignition temperatures.

As an alternative, therefore, it has been proposed to increase the flame resistance of moldable polycarbonate resins by using halogen substituted dihydric phenols to prepare the polymer. It has also been suggested to prepare carbonate copolymers from tetrahalo bisphenol-A and bisphenol-A. However, unless the molar quantity of the halogenated bisphenol in the copolymer is very minor, the copolymers have such high fabrication temperatures that the halogen atoms tend to be liberated at processing temperatures, which halogen atoms in turn degrade the polymer and reduce its properties. On the other hand, the flame resistance of a copolymer containing only minor amounts of halogenated bisphenol units is not materially greater than the flame resistance of a homopolymeric bisphenol-A polycarbonate.

Mixtures of homopolymeric non-halogenated polycarbonates and homopolymeric tetrachlorobisphenol-A polycarbonate as described in U.S. Pat. No. 3,038,874 and mixtures of homopolymeric non-halogenated polycarbonates with copolymers of tetrabromobisphenol A and other phenols, glycols, carboxylic acids and the like as disclosed in U.S. Pat. No. 3,334,514 and various other mixtures of homopolymeric halogenated bisphenol-A polycarbonates have been proposed in order to cure the foregoing difficulties. It has been found, however, that mixtures of bisphenol-A polycarbonates with tetrahalo bisphenol-A polycarbonates are unsuitable as molding compounds, again due to their very high fabrication temperatures with its attendant disadvantages, rendering such materials primarily suitable only for casting films from a solution.

Although brominated polycarbonates do not require fabrication temperatures as high as those which must be used when chlorine-containing polymers and copolymers are used, nevertheless, the less tenacious bromine atom much more readily splits off under polycarbonate processing conditions and severely degrades the polymer rendering it commercially useless even when mixtures of homopolymeric and copolymeric brominated polycarbonates are used in which the concentration of the halogen containing copolymers in the admixture is very low, i.e. even before the halogenated polymer is present at a concentration sufficient to permit it to act as an effective flame retardant. Consequently, a satisfactory means for improving the flame resistance of polycarbonates without adversely affecting any of their desirable properties has heretofore not been available.

It is therefore an object of this invention to provide a flame resistant polycarbonate resin and a method for preparing it which are devoid of the foregoing disadvantages.

Another object of this invention is to provide improved flame retardant high ignition temperature polycarbonate compositions and a method for preparing them.

A further object of this invention is to provide polycarbonate compositions which possess flame resistant properties in conjunction with excellent physical, chemical and mechanical properties which are not degraded under the conditions necessary for processing them and a method for their preparation.

Yet another object of this invention is to provide flame resistant polycarbonate compositions containing halogen atoms, particularly chlorine and bromine atoms, which are nevertheless capable of being processed as a thermoplastic without undergoing degradation due to the evolution of halogen under processing conditions and a process for preparing them.

A still further object of this invention is to provide flame resistant polycarbonate compositions containing a stabilizing amount of a stabilizing system which possesses synergistic properties.

The foregoing objects and others which will become apparent from the following description are accomplished in accordance with this invention, generally speaking, by providing halogen containing polycarbonate compositions which contain an effective amount of barium carbonate, strontium carbonate and/or calcium carbonate to stabilize the composition against the degradative effects of the halogen moiety, with barium carbonate being the preferred stabilizer.

Figure 2:
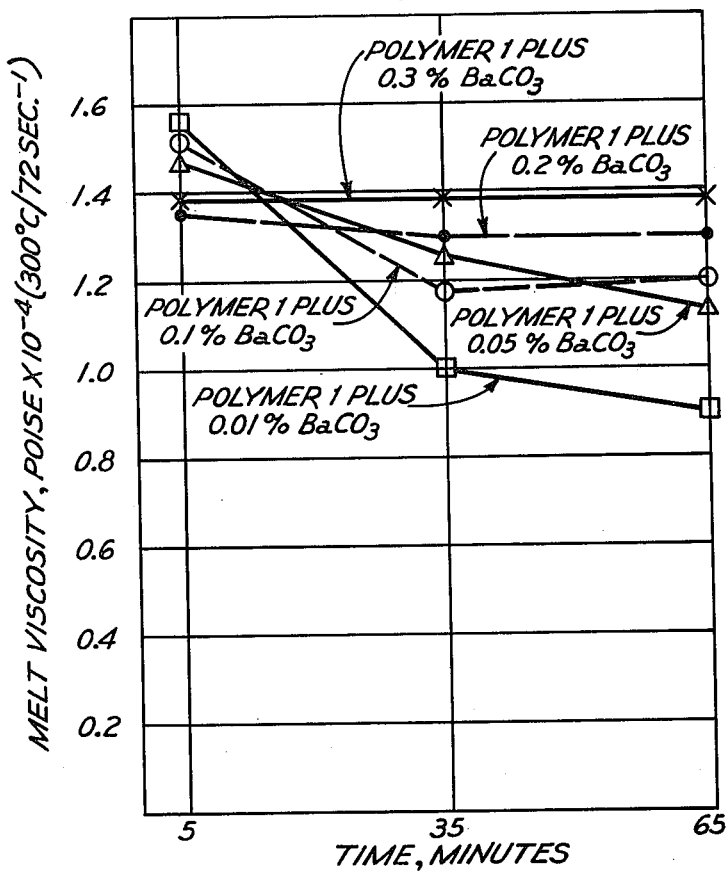
Figure 3:
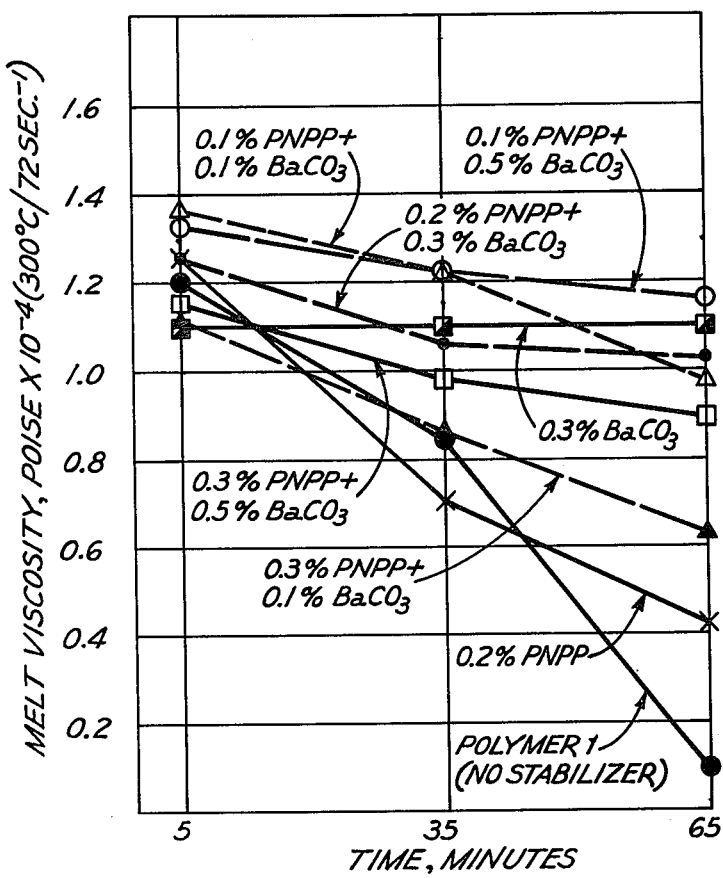
Figure 4:
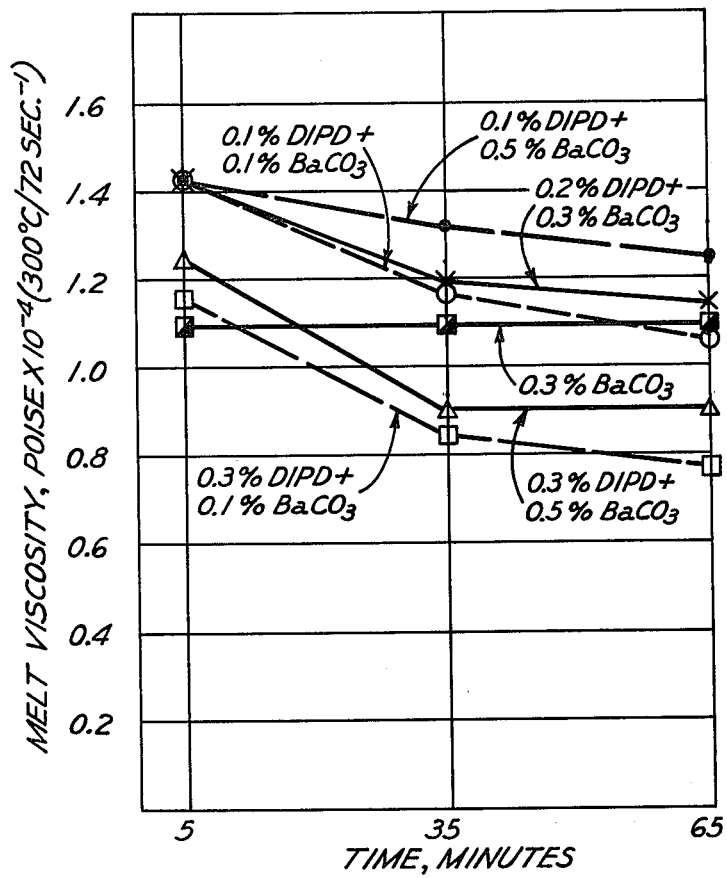
Figure 5:
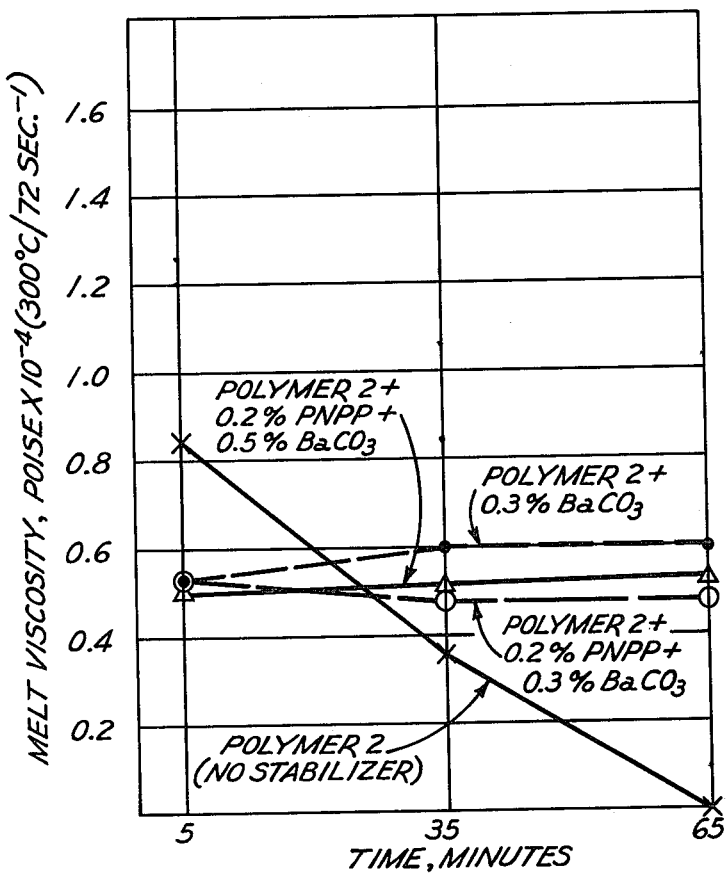
Figure 6:
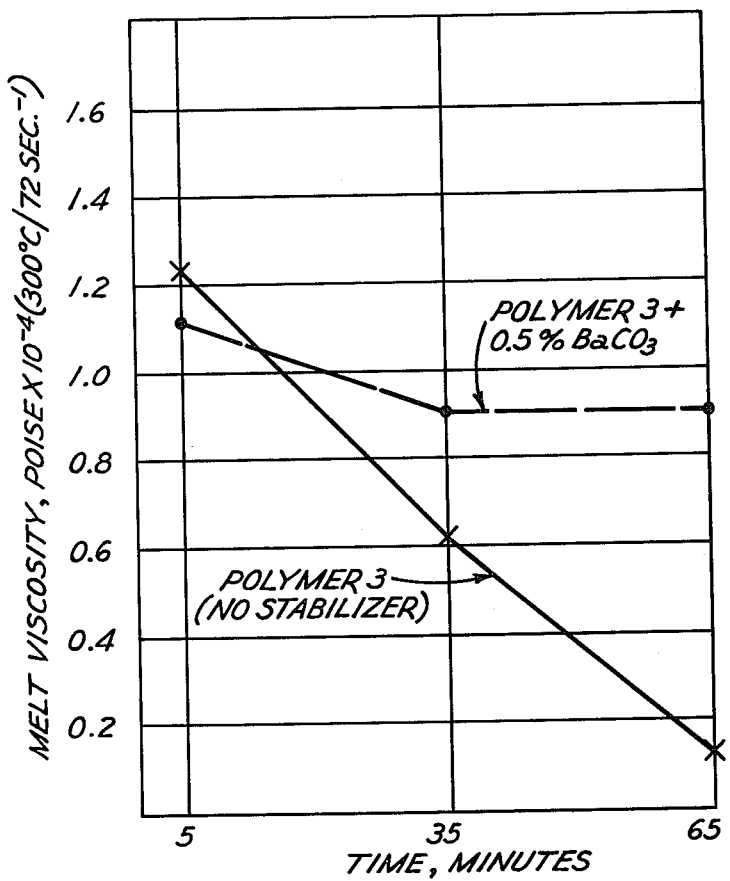

The unexpected results to be achieved by practicing the instant invention are graphically illustrated by reference to the accompanying drawings which deal with a preferred embodiment of this invention in which FIG. 1 shows the effect of various alkaline earth metal carbonates on the Instron Melt Viscosity of Polymer 1 of the examples; FIG. 2 shows the effect of different concentrations of barium carbonate on the Instron Melt Viscosity of Polymer 1 of the examples; FIG. 3 shows the effect of varying amounts of stabilizers on the Instron Melt Viscosity of opaque colored products produced from Polymer 1 of the examples; FIG. 4 shows the effect of varing amounts of stabilizers on Instron Melt Viscosity of opaque colored products using Polymer 1 of the examples; FIG. 5 shows the effect of varying concentrations of stabilizers on the Instron Melt Viscosity of Polymer 2 of the examples and FIG. 6 gives Instron Melt Stability data for Polymer 3 of the examples with and without barium carbonate. The results illustrated in the drawings represent those achieved when any of the stabilizers of this invention are employed in any halogenated polycarbonate.

Although the carbonate stabilizers of this invention can be employed in any amount desired it has generally been found that the most effective concentrations lie within a range of from about 0.01 to about 5 percent by weight of the carbonate based on the weight of the polycarbonate composition. This concentration range is effective even when the concentration of halogenated polycarbonate in the composition is very high or when 100 percent of a halogenated polycarbonate homopolymer is employed. While higher concentrations of the stabilizing carbonates of this invention may be used if desired since they are not detrimental to the properties of the polymer and hence may be employed with impunity, such higher concentrations have not been found to be much more effective. The effects of different concentrations of the stabilizing carbonates of this invention are graphically illustrated in FIG. 2 using the preferred barium carbonate. The results shown in FIG. 2 are representative of those achieved when any of the carbonates of this invention are used in any halogenated polycarbonate generally.

While the results achieved by practicing the instant invention are truly surprising, the mechanism and the theory of the operability of the concept disclosed are not understood. Further, the results achieved are particularly unexpected since the carbonates of other members of the same grouping of the periodic arrangement of the elements in which barium, strontium and calcium are classified do not exert the same or similar effect. In this regard FIG. 1 graphically illustrates the fact that while barium carbonate, strontium carbonate and calcium carbonate do in fact exert the unique stabilizing effect described herein, sodium carbonate causes an increase in melt viscosity from 1.51 to 2.35 $\times$ 10$^{-4}$ poise as measured after 5 and 35 minutes in the Instron instrument at 300° C., and the melt viscosity remained constant this high level for the duration of the test. Apparently, sodium carbonate promotes chain extension or crosslinking which results in the high viscosity. Magnesium carbonate on the other hand completely degraded the polymer. The halogenated polymer without a carbonate stabilizer of this invention became degraded during the test as the points connected by the broken line indicate. The same result is illustrated in FIG. 6 which shows the effect of a stabilizing amount of barium carbonate in Polymer 3 of the examples as compared to the results achieved when Polymer 3 is employed with no carbonate stabilizer of this invention.

It has been found that when the carbonates of this invention are employed in polycarbonate compositions containing halogen atoms, whether the composition is a homopolymeric halopolycarbonate or a copolymer containing halogen atoms or a blend of homopolymers or homopolymers and copolymers, the degradation which unavoidably resulted due to the evolution of halogen atoms under polycarbonate processing conditions is completely avoided. Furthermore, the carbonate stabilizers themselves do not adversely affect or dilute the advantageous properties of the polycarbonates and indeed exert a synergistic effect on halogenated polycarbonate compositions when used together with phosphite stabilizers such as those disclosed in U.S. Patent Application Serial Number 654,693, now U.S. Pat. No. 3,509,091 in Canadian Pat. No. 646,424 and in U.S. Pat. Nos. 3,205,269; 3,305,520; 3,342,767; 3,398,115; 2,867,594 and so on.

Thus, it has been found that when a stabilizing amount of a phosphite such as a 5,5-dimethyl-1,3,2-dioxaphosphorinane, an organic ester of phosphorous acid, a trialkyl, triaryl or mixed tri(alkyl-aryl)phosphite and the like, and particularly triphenyl phosphite, tri(nonylphenyl)phosphite, phenyl didecyl phosphite, pentrite, otherwise known as tetra (dephenyl phosphite) pentaerythritol, the neopentyl phosphites, diisodecyl pentaerythrityl diphosphite, dipentite, otherwise known as diphenyl pentaerythritol diphosphite, and the like is used together with one of the stabilizing carbonates of this invention, particularly barium carbonate, an improvement in the properties of the polymer is achieved which far surpasses the sum of the effect derived from the use of each of the two materials alone. More particularly, the synergistic results manifest themselves in improved color stability and processability particularly at high temperatures and under severe shear in the molding of complicated parts, particularly thin sections. When the carbonates of this invention are employed together with a phosphite stabilizer, particularly phenylneopentyl phosphite or diisodecyl pentaerythrityl diphosphite a polycarbonate polymer is achieved that can be processed without color or molecular weight degradation even under very severe molding conditions. That this result is synergistic is demonstrated by the examples herein as well as the fact that phosphites are known as thermal stabilizers for polycarbonate polymers and it has been disclosed herein that the carbonates of this invention are suitable to stabilize a polycarbonate against the degradative effects of halogen atoms, particularly chlorine and bromine. When put together however the phosphites and carbonates of this invention not only thermally stabilize the product polymer and protect it against the degradative effects of halogen atoms but also impart color stability and processability to the polymer, even at high temperatures and under shear so severe that the polymer would be destroyed otherwise. Since neither the phosphite nor the carbonate additives are known to impart this type of stability to a polymer of any kind, much less a polycarbonate polymer, it is entirely unexpected that the phosphites and carbonates in the stabilizing system of this invention do in fact impart to the polymer heretofore unobtainable and greatly improved color and processability properties. Thus it is clear that in addition to obviating the great disadvantages inherent in the use of halogen containing polycarbonate compositions, the carbonates of this invention are capable of yielding a synergistic effect when employed in conjunction with phosphites, and particularly diisodecyl pentaerythrityl diphosphite, phenylneopentyl phosphite and dipentite.

In addition to the foregoing it is also clear that the carbonates of this invention exert their unique effect on halogenated polycarbonate polymer compositions, notwithstanding the presence of other stabilizers such as, for example, ultraviolet stabilizers such as those listed in U.S. Pat. No. 3,367,958; hydrolysis stabilizers such as those listed in U.S. Pat. No. 3,404,122; modified polycarbonate compositions such as those described in U.S. Pat. No. 3,294,871 and so on. It is also clear that the carbonates of this invention exert their unique effect whether the polycarbonate is noncellular as described for example in U.S. Pat. No. 3,208,365 and 2,999,835 or whether the polycarbonate is a foamed material such as those described in U.S. Pat. Nos. 3,290,261 and 3,277,029. In addition halogenated polycarbonate compositions containing halogen containing additives such as, for example, those described in U.S. Pat. Nos. 3,334,154; 3,365,517; 3,357,942 and the like may also be stabilized in accordance with this invention. Even further, whether or not the polycarbonate composition is made up of a blend of a non-halogen containing polycarbonate with a halogen containing homopolymer or copolymer or whether the polycarbonate composition is entirely made up of a halogen containing polycarbonate such as, for example, those described in U.S. Pat. Nos. 3,413,266; 3,422,065; 3,340,229; 3,326,855 and 3,326,854, the stabilizers of this invention still exert their unique effect. It has been found, however, that although the stabilizers of this invention yield superior and highly unexpected results with respect to the degradative effects of halogen atoms contained in the polycarbonate itself, self, the same results are not achieved when the halogen is not introduced as part of the polymer itself. For example, the polymer would not be stabilized against the degradative effects of a halogen introduced via an additive such as phosphorus tribromide and so on.

The stabilizers of this invention may be added to the polycarbonate composition in any suitable manner which will insure a thorough distribution of the stabilizers in the polycarbonate resin. For example, powdered or granular polycarbonates may be mixed with the stabilizers of this invention by any of a variety of methods normally employed for incorporating plasticizers and fillers into thermoplastic polymers including, but not limited to mixing rolls, dough mixers, Banbury mixers, extruders and any other suitable mixing equipment. The resulting mixtures may then be handled in any conventional manner used in the manufacture and manipulation of thermoplastic resins. The mixture may be formed or molded using compression injection, calendering, casting and extrusion techniques. In addition, the carbonate stabilizers of this invention may be added to a solution of the polycarbonate as it is prepared or they may be added to a polycarbonate melt. The carbonate stabilizers may also be added to the components from which the polycarbonate is to be prepared or at any time thereafter. Where the stabilizing system described herein which includes a carbonate of this invention together with a phosphorus stabilizer such as phenylneopentyl phosphite or diisodecyl pentaerythrityl diphosphite or the like is used, the system may also be incorporated into the polycarbonate composition as described above since the phosphorus containing components are also soluble in polycarbonates generally.

It is to be understood that the polycarbonate compositions prepared in accordance with this invention may also contain, in addition to the carbonates and the stabilizing system of this invention, other additives to lubricate, prevent oxidation, color or fill the composition and so on. Any such additives well known in the art may be thus incorporated without departing from the scope of the invention including pigments, such as for example, white opaque pigments including lead, zinc, titanium and antimony oxide pigments, red, maroon and brown inorganic pigments composed of the various oxides of iron; cadmium yellows, cadmium reds and cadmium maroons, such as cadmium sulfoselenides, cadmium sulfides, and the like, green pigments such as chrome greens, chromium oxides and the hydrated chromium oxides; blue pigments such as iron blues and ultramarine blues, carbon blacks, iron oxide blacks and the like. Particular examples of suitable pigments include Pigment Blue 15 (C.I. 74160), Diluted Black-PDS 161 B-192 (Kohnstamm), Solvent Violet 13 (C.I. 60725), Yellow 37 (C.I. 77199), Cadmium Red (C.I. 77196), Croton Fast Green Toner 4D-3600 (Harshaw Chemical Co.), Amaplast Yellow GHS (Drakenfeld), PDS 987 Thermax Blue-Black (Kohnstamm), Marine Blue (Drakenfeld), Scarlet Red 10177 (Drakenfeld), Scarlet Red 10051 (Drakenfeld), phthalocyanine pigments such as, for example, copper phthalocyanine (Monastral Fast Blue B or Heliogen Blue BA), chlorinated copper phthalocyanine (Monastral Fast Green G or Heliogen Green GA), sulfonated copper phthalocyanine, metal free phthalocyanine (Monastral Fast Blue G) and phthalocyanine derivatives in which one or more of the external hydrogen atoms are replaced by other groups such as halogen, alkyl, aryl, amino, nitro, substituted amino, sulfo, carboxy, alkoxy, aryloxy, thiocyano and the like.

Any polycarbonate polymer prepared by any of those techniques known in the art may be used in the polycarbonate composition of the instant claims. The polycarbonate composition can be produced from a dihydroxy diaryl alkane and phosgene or a diester of carbonic acid, for example, as described in Canadian Pat. Nos. 578,585; 578,795; 594,804; U.S. Pat. Nos. 3,028,365 and 2,999,835. Other processes contemplated for producing polycarbonates to be used in the compositions that may be stabilized in accordance with this invention include those referred to in "Polycarbonates" by William F. Christopher and Daniel W. Fox, as well as those disclosed in U.S. Pat. Nos. 2,999,846; 3,153,008; 3,215,668; 3,187,065; 2,970,131; 2,964,794; 2,991,273; 3,094,508; 3,215,667, 3,227,740; 3,248,414; 3,148,172; 3,380,965; 3,014,891; 3,320,211; 3,277,054; 3,280,078; 3,271,368; 3,271,367; 3,261,808; 3,251,803 as well as those listed elsewhere herein and so on.

The polycarbonate compositions of this invention are eminently suitable for use in any of those applications for which polycarbonates are suitable, and particularly when improved flammability is required. For example the polycarbonates stabilized in accordance with this invention may be used in the preparation of masks, interior decorative panels, structural components for airplane interiors, in electronic equipment such as for terminal blocks, helmets, wall facing or for any other suitable application.

The invention is further illustrated but is not intended to be limited by the following examples in which all parts and percentages are by weight unless otherwise specified.

POLYMER 1

4.5 mol percent tetrabromo bisphenol A - 95.5 mol percent bisphenol A copolycarbonate About 492.5 parts of 2,2-bis(4-hydroxyphenyl)propane (bisphenol A) (2.16 mols) and about 55.5 parts of 2,2-bis(3,5-dibromo-4-hydroxyphenyl)-propane (tetrabromo bisphenol A) (0.102 mols) and about 3.4 parts of p-t-butyl phenol are suspended in about 1958 parts of water and well agitated in a three neck reaction flask equipped with a gas addition tube and a drip tube for the addition of liquid. Oxygen is removed from the suspended bisphenol A slurry by blowing nitrogen through it for about 15 minutes, after which about 361.6 parts of a 50 percent solution of sodium hydroxide is added. The reaction flask is then cooled to about 25° C. with external cooling after which about 1149 parts of methylene chloride are added to the reactor with stirring. While stirring is maintained, phosgene is then charged into the reaction mixture at such a rate that over a 100 minute period, about 268.5 parts (2.71 mols) of $COCl_2$ are added. Simultaneously with the start of phosgenation, a 50 percent caustic solution is also metered into the reaction mixture at such a rate that in an 80 minute period about 109 parts of NaOH solution are added to the mixture. The temperature during the phosgenation reaction is maintained at about 25° C. by external cooling. At the end of phosgenation, the reaction slurry is transferred to a mixer where approximately 2 parts of triethylamine is added and the mixture is agitated until a heavy dough is formed. The resulting dough is washed with a phosphoric acid solution and finally water to remove electrolytes. The polycarbonate obtained by this method is isolated as a dry powder. The product has a relative viscosity of about 1.30 measured on a solution of 0.5 parts of polymer in 100 mls. of methylene chloride at 25° C. The copolymer product will contain from about 5 to about 5.3 percent by weight of bromine.

POLYMER 2

10 mol percent tetrabromo bisphenol A - 90 mol percent bisphenol A copolycarbonate About 464.3 parts of bisphenol A (2.03 mol), about 125.1 parts of tetrabromo bisphenol A (0.23 mols) and about 3.38 parts of p-t-butyl phenol are suspended in about 1958 parts of water and well agitated in a three neck flask. The same procedure is then followed as outlined above for Polymer 1.

The resulting polymer will contain from about 11 to about 12 percent by weight of bromine and have a relative viscosity of 1.28 measured on a solution of 0.5 parts of polymer in 100 mls. of methylene chloride at 25° C.

POLYMER 3

19 mol percent tetrabromo bisphenol A - 81 mol percent bisphenol A copolycarbonate About 417.2 parts of bisphenol A (1.83 mols) and about 233.9 parts of tetrabromo bisphenol A (0.43 mols) are suspended in about 1958 parts of water and well agitated in a three neck flask. The same procedure is then followed as outlined above for Polymer 1.

The resulting polymer will contain from about 18 to about 19 percent by weight of bromine and have a relative viscosity of about 1.25 measured on a solution of 0.5 parts of polymer in 100 mls. of methylene chloride at 25° C.

POLYMER 4

About 454 parts of 4,4'-dihydroxydiphenyl-2,2-propane and about 9.5 parts of p-tertiary-butyl phenol are suspended in about 1.5 liters of water. In a three neck flask equipped with agitation and a gas addition tube, oxygen is removed from the mixture by blowing nitrogen through it while agitating for about 15 minutes. Then about 355 parts of 45 percent sodium hydroxide and about 1,000 parts of methylene chloride are added. The mixture is cooled to about 25° C. While maintaining this temperature by cooling, about 237 parts of phosgene are added uniformly over about a 120 minute period. An additional about 75 parts each of a 45 percent sodium hydroxide solution are added after about 15 to 30 minutes respectively after the phosgene addition has begun. To the resulting solution, about 1.6 parts of triethylamine are added and the mixture is agitated for an additional 15 minutes. A highly viscous solution is formed, the viscosity of which is adjusted by the addition of methylene chloride and the aqueous phase is separated. The organic phase is washed with water until free of salt and alkali. the polycarbonate is recovered from the washed solution and dried. The polycarbonate has a relative viscosity of 1.32 measured from a 0.5 percent solution of methylene chloride at 20° C., equivalent to approximately at 34,000 molecular weight product.

Rheological, Physical Property and Flammability data were gathered on various samples of polymers prepared as outlined above and tabulated in the following Tables I to III. The melt stability of the various polymers was determined at 300° C. The Instron stability test used measures the melt viscosity (poise $\times 10^{-4}$) of the polymer after 5, 35 and 65 minutes residence time in the Instron barrel at 300° C. and at a shear rate of 72 seconds $^1$ on the polymer. The amount of change in the measured viscosity between 5 and 65 minutes in this test is a good indication of the stability of the polymer being tested. If there is a large drop in the viscosity between 5 and 65 minutes, the polymer is considered unstable, however, if the difference in the viscosity between 5 and 65 minutes is small the polymer is stable.

The relative viscosities for the samples were determined on the orginal pellets and 65 minutes strand by dissolving 0.5 grams of the polymer in 100 ml. of methylene chloride and measuring the viscosity at 25° C.

The Izod impact test used followed the ASTM procedure D-256 on notched ⅛ inch and ¼ inch samples.

The percentages of the samples passing U.L. flammability requirements as Class I materials was determined by using the Underwriter's Laboratories, Inc. testing procedure described in the U.L. memorandum bulletin, Subject 94, "Burning Tests of Plastics", Dec. 9, 1959. In this test molded specimens 1/16 inch $\times$ ½ $\times$ 6 inch are placed in a vertical position so that their lower end is ⅜ inch above the top of the bunsen burner tube and the flame of the burner is adjusted to produce a blue flame ¾ inch in height. The test flame is placed centrally under the lower end of the test specimen and allowed to remain for 10 seconds. The test flame is then withdrawn, and the duration of flaming or glowing combustion of the specimen noted. If flaming or glowing combustion of the specimen ceases within 30 seconds after removal of the test flame, the test flame is again placed under the specimen for 10 seconds immediately after flaming or glowing combustion of the specimen stops. The test flame is again withdrawn, and the duration of flaming or glowing combustion of the specimen noted.

The duration of flaming or glowing combustion of any single specimen after application of the test flame shall not exceed 30 seconds and the average of three specimens (six flame applications) shall not exceed 25 seconds. Futhermore, the specimen shall not be completely consumed in the test. In other words, 100 percent of all specimens tested must pass the 30-second test. Materials which do not comply with the above requirements or which do comply but drop flaming particles or droplets which burn even if only briefly during the test were considered to fail as class 1 materials in the date reported below.

TABLE

RHEOLOGICAL, PHYSICAL PROPERTY, AND FLAMMABILITY DATA ON STABILIZED AND UNSTABILIZED SAMPLES OF POLYMER 1

| Stabilizer System | Color | Melt Stability at 300° C./72 sec [1] Instron Rheometer (Poise × 10$^{-4}$) | | | Relative Viscosities | | Izod Impact Ft. lb./in. notch | | Flammability U.L. 1/16" Specimens |
|---|---|---|---|---|---|---|---|---|---|
| | | 5 min. | 35 min. | 65 min. | Original Pellets | 65 minutes Strand | 1/8" | 1/4" | |
| 0.05% POLYGARD tris(mixed mono-/and dinonylphenyl)phosphite | Natural | 1.02 | 0.90 | 0.67 | 1.296 | 1.259 | 17.0 | 1.9 | 20% Class I |
| 0.05% POLYGARD + 0.01% triisooctyl phosphate | Natural | 1.46 | 1.23 | 0.29–0.14 | 1.329 | 1.290 | 16.7 | 2.3 | 90% Class I |
| 0.05% POLYGARD + 0.01% triisooctyl phosphate | Natural | 1.32 | 0.58 | 0.23–0.12 | 1.322 | 1.244 | 16.5 | 2.1 | 65% Class I |
| 0.05% POLYGARD + 0.01% triisooctyl phosphate | Natural | 1.51 | 1.25 | 0.20–0.10 | 1.322 | — | | | 90% Class I |
| 0.2% POLYGARD | Beige[1] | 1.20 | 1.20 | 0.63–0.36 | | | | | |
| None | Avocado[3] | 1.11 | 1.03 | 1.03 | 1.326 | 1.308 | | | |
| None | Avocado[3] | 1.20 | 1.06 | 1.06 | | | | | |
| 0.2% POLYGARD | Beige[2] | 1.23 | 0.92 | 0.18 | 1.316 | — | | | |
| None | Beige[2] | 0.72 | 0.62 | 0.48 | 1.323 | 1.276 | 2.1 | 1.6 | 20% Class I |
| None | Green[4] | 1.51 | 1.28 | 0.48 | — | — | — | — | |
| None | Black[5] | 1.50 | 0.99–0.84 | 0.48–0.34 | — | — | — | — | — |
| None | Translucent White[6] | 1.44 | 0.91–0.84 | 0.31–0.23 | — | — | — | — | — |
| 0.2% Tetraphenyl Tin | Natural | 1.44 | 1.56 | 1.66 | 1.332 | 1.345 | — | — | 0% Class I |
| 0.1% Tetraphenyl Tin | Natural | 1.22 | 1.27 | 1.30 | 1.334 | 1.342 | — | — | — |
| 0.05% Tetraphenyl Tin | Natural | 1.34 | 1.33 | 1.27 | 1.341 | 1.339 | — | — | — |
| 0.01% Tetraphenyl tin | Natural | 1.30 | 1.15 | 0.74 | 1.327 | 1.317 | — | — | — |
| 0.3% Ba—Cd Carboxylate | Natural | 0.73 | 0.62 | 0.53 | 1.318 | 1.271 | | | |
| 0.3% Ba—Cd—Zn Carboxylate | Natural | 0.58 | 0.53 | 0.42 | 1.289 | 1.265 | | | |
| 0.3% Ba—Cd Laurate | Natural | 0.67 | 0.58 | 0.48 | 1.310 | 1.272 | | | |
| 0.3% Ba—Cd—Zn Laurate | Natural | 0.58 | 0.53 | 0.53 | 1.291 | 1.265 | | | |
| 0.3% Barium Metaborate | Natural | 1.13 | 0.87 | 0.82 | 1.324 | 1.299 | 3.1 | 1.9 | 50% Class I |

[1] TiO$_2$ - 4.00 grams per pound of polycarbonate
Dilute Black - 0.060 grams per pound of polycarbonate
Cadmium Orange - 0.0176 grams per pound of polycarbonate
Cadmium Yellow - 0.0080 grams per pound of polycarbonate
POLYGARD - 0.9080 grams per pound of polycarbonate
[2] TiO$_2$ - 1.987 grams per pound of polycarbonate
Dilute Black - 0.0238 grams per pound of polycarbonate
Cadmium Orange - 0.0079 grams per pound of polycarbonate
Cadmium Yellow - 0.0041 grams per pound of polycarbonate
POLYGARD - 0.9080 grams per pound of polycarbonate
[3] TiO$_2$ - 1.8138 grams per pound of polycarbonate
Dilute Black - 1.6231 grams per pound of polycarbonate
Cadmium Yellow - 0.5631 grams per pound of polycarbonate
Phthalo Green - 0.0116 grams per pound of polycarbonate
[4] 0.002 g./lb. of polycarbonate or 0.0044% phthalo green pigment
[5] 1.5 g/lb. of polycarbonate or 0.33% Diluted Black Pigment
[6] 1.5 g./lb. of polycarbonate or 0.33% BaSO$_4$

TABLE II

RHEOLOGICAL, PHYSICAL PROPERTY, AND FLAMMABILITY DATA ON ALKALINE EARTH METAL CARBONATE STABILIZED FLAME RESISTANT POLYCARBONATE

| Polymer | Stabilizer System | Color | Melt Stability at 300° C/72 sec [1] Instron Rheometer(Poise × 10$^{-4}$) | | | Relative Viscosities | | Izod Impact Ft.lb./in. notch | | Flammability U.L. 1/16" Specimens |
|---|---|---|---|---|---|---|---|---|---|---|
| | | | 5 min. | 35 min. | 65 min. | Original Pellets | 65 Minutes Strand | 1/8" | 1/4" | |
| 1 | 0.33% Calcium Carbonate | T.W. | 1.39 | 1.25 | 1.02 | — | — | | | |
| 1 | 0.165% Calcium Carbonate | T.W. | 1.20 | 1.10 | 1.05 | 1.323 | 1.310 | | | |
| 1 | 0.0825% Calcium Carbonate | T.W. | 1.37 | 1.20 | 1.05 | 1.330 | 1.308 | | | |
| 1 | 0.3% Barium Carbonate | T.W. | 1.39 | 1.39 | 1.39 | 1.318 | 1.322 | 2.4 | 1.6 | 70% Class I |
| 1 | 0.2% Barium Carbonate | T.W. | 1.37 | 1.30 | 1.30 | 1.337 | 1.335 | — | — | — |
| 1 | 0.1% Barium Carbonate | T.W. | 1.49 | 1.17 | 1.20 | 1.342 | 1.326 | 2.5 | 1.9 | 100% Class I |
| 1 | 0.05% Barium Carbonate | T.W. | 1.47 | 1.27 | 1.15 | 1.328 | 1.325 | 7.0 | 1.8 | 100% Class I |
| 1 | 0.01% Barium Carbonate | T.W. | 1.54 | 1.10 | 0.67 | — | — | 2.3 | 2.0 | 90% Class I |
| 1 | 0.3% Strontium Carbonate | T.W. | 1.42 | 1.35 | 1.35 | | | 2.8 | 1.7 | |
| 1 | 0.3% Sodium Carbonate | T.W. | 1.51 | 2.35 | 2.35 | | | | | |
| 1 | 0.3% Magnesium Carbonate | T.W. | 0.36 | Degraded | Degraded | | | | | |
| 1 | 0.3% Barium Carbonate | T.W. | 1.46 | 1.34 | 1.34 | 1.332 | 1.324 | 2.4 | 2.1 | 80% Class I |
| 1 | 0.3% Barium Carbonate | T.W. | 1.48 | 1.32 | 1.32 | 1.347 | 1.331 | 2.4 | 1.9 | 80% Class I |
| 1 | 0.3% Barium | T.W. | 1.48 | 1.42 | 1.32 | 1.329 | 1.325 | 2.1 | 1.9 | 60% Class I |

TABLE II-continued
RHEOLOGICAL, PHYSICAL PROPERTY, AND FLAMMABILITY DATA ON ALKALINE EARTH METAL CARBONATE STABILIZED FLAME RESISTANT POLYCARBONATE

| Polymer | Stabilizer System | Color | Melt Stability at 300° C/72 sec Instron Rheometer(Poise × 10⁴) | | | Relative Viscosities | | Izod Impact Ft.lb./in. notch | | Flammability U.L. 1/16" |
|---|---|---|---|---|---|---|---|---|---|---|
| | | | 5 min. | 35 min. | 65 min. | Original Pellets | 65 Minutes Strand | 1/8" | 1/4" | Specimens |
| 1 | Carbonate 0.2% Phenylneopentyl phosphite + 0.3% Barium Carbonate | T.W. | 1.30 | 1.15 | 1.15 | 1.326 | 1.314 | 17.8 | 1.9 | 80% Class I |
| 4 | None | Natural | 1.01 | 0.65 | 0.65 | | | | | |
| 4 | 0.3% Barium Carbonate | T.W. | 0.94 | 0.91 | 0.91 | | | | | |
| 4 | 0.3% Sodium Carbonate | T.W. | 0.43 | 0.14 | Degraded | | | | | |
| 2 | 0.3% Barium Carbonate | T.W. | 0.55 | 0.60 | 0.60 | 1.253 | 1.254 | 1.6 | 0.96 | 100% Class I |
| 2 | 0.2% Phenylneopentyl phosphite + 0.3% Barium Carbonate | T.W. | 0.55 | 0.46 | 0.45 | 1.253 | 1.232 | 1.5 | 1.1 | 100% Class I |
| 2 | 0.2% Phenylneopentyl phosphite + 0.5% Barium Carbonate | T.W. | 0.54 | 0.51 | 0.51 | 1.253 | 1.237 | 1.0 | 0.7 | 100% Class I |
| 2 | None | Natural | 0.84 | 0.36 | Degraded | 1.276 | 1.232 | 1.9 | 1.7 | 87% Class I |

T.W. - Translucent White

TABLE III
RHEOLOGICAL, PHYSICAL PROPERTY, AND FLAMMABILITY DATA ON STABILIZED OPAQUE BEIGE[1] COLORED PRODUCTS MADE FROM POLYMER 1

| Stabilizer System Evaluated | Melt Stability at 300° C./72 sec Instron Rheometer(Poise × 10⁴) | | | Relative Viscosities | | Izod Impact Ft. lb./in. notch | | Flammability U.L. 1/16" |
|---|---|---|---|---|---|---|---|---|
| | 5 min. | 35 min. | 65 min. | Original Pellets | 65 Minutes Strand | 1/8" | 1/4" | Specimen |
| 0.33% Calcium Carbonate[2] | 1.20 | 0.91 | 0.74 | 1.312 | 1.311 | | | |
| 0.33% Barium Carbonate[2] | 1.10 | 1.06 | 1.10 | 1.313 | 1.309 | | | |
| 0.2% POLYGARD | 1.23 | 0.92 | 0.18 | 1.316 | | | | |
| 0.3% Barium Carbonate | 1.10 | 1.10 | 1.10 | 1.325 | 1.324 | 2.7 | 1.8 | 70% Class I |
| 0.3% Barium Carbonate | 1.15 | 1.15 | 1.15 | 1.323 | 1.328 | 2.7 | 1.8 | 80% Class I |
| 0.2% PNPP | 1.25 | 0.68 | 0.41 | | | | | |
| 0.2% PNPP + 0.3% BaCO₃ | 1.25 | 1.08 | 1.03 | | | | | |
| 0.1% PNPP + 0.5% BaCO₃ | 1.35 | 1.22 | 1.15 | 1.332 | 1.311 | 2.5 | 1.6 | 100% Class I |
| 0.1% PNPP + 0.1% BaCO₃ | 1.39 | 1.22 | 0.98 | 1.331 | 1.302 | 2.5 | 2.4 | 60% Class I |
| 0.3% PNPP + 0.5% BaCO₃ | 1.15 | 0.98 | 0.87 | 1.324 | 1.296 | 2.4 | 2.5 | 90% Class I |
| 0.3% PNPP + 0.1% BaCO₃ | 1.11 | 0.84 | 0.62 | 1.324 | 1.283 | 2.4 | 2.3 | 80% Class I |
| 0.2% Diisodecyl pentaerythrityl diphosphite + 0.3% BaCO₃ | 1.42 | 1.19 | 1.12 | | | | | |
| 0.1% Diisodecyl pentaerythrityl diphosphite + 0.5% BaCO₃ | 1.42 | 1.32 | 1.25 | 1.325 | 1.314 | 1.9 | 1.6 | 100% Class I |
| 0.1% Diisodecyl pentaerythrityl diphosphite + 0.1% BaCO₃ | 1.42 | 1.18 | 1.06 | 1.325 | 1.303 | 2.3 | 1.8 | 100% Class I |
| 0.3% Diisodecyl pentaerythrityl diphosphite + 0.5% BaCO₃ | 1.25 | 0.89 | 0.89 | 1.324 | 1.296 | 2.6 | 1.7 | 100% Class I |
| 0.3% Diisodecyl pentaerythrityl diphosphite + 0.1% BaCO₃ | 1.15 | 0.87 | 0.77 | 1.334 | 1.290 | 2.3 | 2.3 | 100% Class I |
| 0.2% POLYGARD + 0.3% BaCO₃ | 1.27 | 1.20 | 1.20 | | | 2.7 | 1.4 | 80% Class I |
| 0.2% Diisodecyl pentaerythrityl diphosphite + 0.3% BaCO₃ | 1.32 | 1.10 | 1.03 | | | 2.9 | 1.7 | 100% Class I |
| 0.1% PNPP + 0.1% SrCO₃ | 1.49 | 1.20 | 0.98 | 1.335 | 1.304 | 1.8 | 1.7 | 80% Class I |
| 0.1% PNPP + 0.5% SrCO₃ | 1.49 | 1.08 | 1.01 | 1.321 | 1.308 | 2.3 | 2.1 | 60% Class I |
| 0.3% PNPP + 0.5% SrCO₃ | 1.20 | 0.72 | 0.65 | 1.340 | 1.283 | 2.4 | 1.7 | 50% Class I |
| 0.2% PNPP + 0.3% SrCO₃ | 1.30 | 0.94 | 0.74 | 1.344 | 1.280 | 2.9 | 1.6 | 60% Class I |
| 0.2% PNPP + 0.3% BaCO₃ | 1.32 | 1.13 | 1.03 | 1.334 | 1.310 | 1.9 | 1.6 | 70% Class I |

[1]Color formation
TiO₂ - 1.987 grams per pound of polycarbonate
Dilute Black - 0.0238 grams per pound of polycarbonate
Cadmium Orange - 0.0079 grams per pound of polycarbonate
Cadmium Yellow - 0.0041 grams per pound of polycarbonate
POLYGARD - 0.9080 grams per pound of polycarbonate
[2]The calcium carbonate and barium carbonate were blended on colored pellets and re-extruded.

EXAMPLE

In order to demonstrate the synergistic effect of combinations of phosphite thermal stabilizers and the carbonates of the invention to produce a more color stable colored product, a sample of an opaque beige colored product made from Polymer 1 and containing the following color formulation was prepared:

TiO₂ — 1.987 grams per pound of polycarbonate
Dilute Black — 0.0238 grams per pound of polycarbonate
Cadmium Orange — 0.0079 grams per pound of polycarbonate
Cadmium Yellow — 0.0041 grams per pound of polycarbonate Samples of the colored product thus prepared were dissolved in a sufficient amount of methylene chloride to produce a 5 percent polymer solution. The pigments were filtered using a pressure filter apparatus and the filtrate (free of solids) was spectrophotometrically analyzed. The Yellow Index was calculated from the analysis. The Yellow Index is a measure of the degree of yellowness of one sample compared to another. The higher the Yellow Index the more yellow is the sample compared to another sample. The Yellow Index was calculated using the following formula:

$$Y.I. = \frac{128X - 106Z}{Y}$$

where X, Y and Z are tristimulus values obtained from the integrator on the GE recording spectrophotometer which are used to locate a color in color space.

The data obtained are as follows:

| Stabilizer System | Y.I. |
|---|---|
| None | 106.8 |
| 0.2% BaCO₃ | 205.9 |
| 0.3% BaCO₃ | 180.6 |
| 0.2% Phenylneopentyl phosphite | 71.9 |
| 0.1% PNPP + 0.1% BaCO₃ | 17.6 |
| 0.1% DIPD + 0.1% BaCO₃ | 19.6 |

The same synergistic effect was not achieved when the same stabilizer systems were employed in a polycarbonate which did not contain bromine atoms. Additional data obtained using the opaque beige colored product made from Polymer 1 as described in this Example can be found in FIGS. 3 and 4 while the effects of the stabilizer of this invention with Polymer 2 are graphically illustrated in FIG. 5.

POLYMER 5

About 12 liters of distilled H₂O, about 2100 parts of bis-2,2-(4,4'dihydroxydiphenyl) propane (9.2 mol), about 283 parts of bis-2-(3,5-3',5'-tetrachlor-4,4'dihydroxydiphenyl) propane (0.8 mol), about 45 parts of p-tert.-butyphenol (3.0 mol %), about 920 parts of NaOH 45% (10.5 mol) and about 22 liters of CH₂Cl₂ are introduced consecutively into a nitrogen filled vessel. The mixture is then stirred until the phenols go into solution whereupon, with intense stirring at about 25° to 30° C., about 1,350 parts (1.37 mol) of phosgene is added within about 90 minutes. After about 1000 parts of phosgene is introduced, another about 750 ml. of 45% NaOH are dropped in to maintain a pH-value of about 12–13. After the addition of phosgene, another about 500 ml. of sodium hydroxide (45%) and about 10 ml. of triethylamine (1 mol %) are added, followed by about 1 hour of stirring to complete the polycondensation reaction.

The organic phase which contains the polycarbonate is separated and washed free of electrolytes successively with 2% sodium hydroxide, 2% phosphoric acid and finally distilled water. The methylene chloride solution is then worked up by adding monochlorobenzene. After being cooled, the chlorobenzene solution gels and is then pulverized in a granulator into a powder-granule mixture which is dried at about 120° C. in a water spray vacuum. The relative viscosity (0.5 g product in 100 ml. of CH₂Cl₂ at 25° C.) is about 1.28, and the chlorine content is about 4.5 percent of the weight of the copolycarbonate.

Rheological and Physical Property data were gathered on various samples of polymers prepared as outlined above and tabulated in the following Tables IV and V. The melt stability of the various samples was determined at 300° C. The Instron stability test used measures the melt viscosity (poise × 10⁻⁴) of the polymer after 5, 35 and 65 minutes residence time in the Instron barrel at 300° C. and at a shear rate of 72 seconds⁻¹ on the polymer. The amount of change in the measured viscosity between 5 and 65 minutes in this test is a good indication of the stability of the polymer being tested. If there is a large drop in the viscosity between 5 and 65 minutes, the polymer is considered unstable; however, if the difference in the viscosity is small the polymer is stable.

The relative viscosities for the samples were determined by dissolving 0.5 grams of the polymer in 100 ml. of methylene chloride and measuring the viscosity at 25° C.

The amounts of the stabilizers used are specified in percentages by weight based on the weight of the thermoplastic or thermoplastic mixture.

The Izod Impact test used followed DIN norms 53453; elongation was measured according to DIN 53455; the spectral color density $P_c$ was measured according to DIN 5033 and the burning test involved suspending vertically a test bar having dimensions of 120 × 10 × 4 mm. and exposing it to a Bunsen burner flame of 2 cm. height. The sample passes the test when the test bar does not remain burning for more than 30 seconds after removal of the flame and/or does not drip and burn.

At temperatures of from about 320° to 340° C. which are quite commonly employed in polycarbonate processing, the stabilizing effect of the stabilizers, particularly the stabilizing mixtures of this invention are readily apparent, as see, for example, the data collated in Table V. By the addition of 0.5 weight percent of barium carbonate and 0.2% of diisodecyl pentaerythrityl diphosphite, the breakdown of the halogenated polycarbonate is about 60% to 70% smaller than unstabilized polycarbonate as see, for example, Table V. The values for the spectral color densities (remissions) show the improvements brought about by the stabilizers with regard to the constancy of color upon processing. Unstabilized products can no longer be processed into usable parts after temperatures of 330° to 340° C. are reached since they then show signs of deterioration and degradation, i.e., brown streaks and general darkening of color.

TABLE IV

RHEOLOGICAL AND PHYSICAL PROPERTY DATA ON ALKALINE EARTH METAL CARBONATE STABILIZED FLAME RESISTANT POLYCARBONATE POLYMER 6

| Stabilizer System | Color | Melt stability at 300° C./72 sec⁻¹ Instron Rheometer(poise × 10⁻⁴) | | | Relative Viscosities | | Izod Impact cmkg/cm |
|---|---|---|---|---|---|---|---|
| | | 5 min. | 35 min. | 65 min. | Original Pellets | 65 min. extruded Strand | |
| 0.5% CaCO₃ | T.W. | 0.52 | 0.50 | 0.50 | 1.280 | 1.270 | 12.6 |
| 0.5% SrCO₃ | T.W. | 0.56 | 0.67 | 0.84 | 1.277 | 1.274 | 13.9 |
| 0.5% BaCO₃ | T.W. | 0.54 | 0.67 | 0.67 | 1.274 | 1.282 | 17.1 |
| 0.2% BaCO₃ | T.W. | 0.68 | 0.68 | 0.65 | 1.277 | 1.283 | 79.5 |
| 0.5% CaCO₃ + 0.2% diisodecyl pentaerythrityl diphosphite | T.W. | 0.62 | 0.63 | 0.54 | 1.279 | 1.279 | 12.2 |
| 0.5% SrCO₃ + 0.2% diisodecyl pentaerythrityl diphosphite | T.W. | 0.54 | 0.56 | 0.56 | 1.278 | 1.273 | 16.9 |

TABLE IV-continued
RHEOLOGICAL AND PHYSICAL PROPERTY DATA ON ALKALINE EARTH METAL CARBONATE STABILIZED FLAME RESISTANT POLYCARBONATE POLYMER 6

| Stabilizer System | Color | Melt stability at 300° C./72 sec Instron Rheometer(poise × 10⁻⁴) | | | Relative Viscosities | | Izod Impact cmkg/cm |
|---|---|---|---|---|---|---|---|
| | | 5 min. | 35 min. | 65 min. | Original Pellets | 65 min. extruded Strand | |
| 0.5% BaCO₃ + 0.2% diisodecyl pentaerythrityl diphosphite | T.W. | 0.74 | 0.55 | 0.54 | 1.278 | 1.269 | 12.1 |
| 0.3% BaCO₃ + 0.2% diisodecyl pentaerythrityl diphosphite | T.W. | 0.61 | 0.54 | 0.54 | 1.278 | 1.269 | 13.7 |
| 0.2% diisodecyl pentaerythrityl diphosphite | Natural | 0.56 | 0.54 | 0.51 | 1.263 | 1.261 | 16.7 |
| 0.2% phenylneopentyl phosphite | Natural | 0.64 | 0.56 | 0.54 | 1.277 | 1.259 | 16.2 |
| None | Natural | 0.73 | 0.70 | 0.60 | 1.280 | 1.270 | 11.9 |
| 0.5% CaCO₃ + 0.2% diisodecyl pentaerythrityl diphosphite | White (0.5% TiO₂) | 0.55 | 0.52 | 0.46 | 1.275 | 1.264 | 12.7 |
| 0.5% SrCO₃ + 0.2% diisodecyl pentaerythrityl diphosphite | White (0.5% TiO₂) | 0.56 | 0.52 | 0.47 | 1.277 | 1.267 | 15.3 |
| 0.5% BaCO₃ + 0.2% diisodecyl pentaerythrityl diphosphite | White 10.5% TiO₂) | 0.57 | 0.52 | 0.50 | 1.280 | 1.266 | 17.8 |
| 0.2% BaCO₃ + 0.2% diisodecyl pentaerythrityl diphosphite | White (0.5% TiO₂) | 0.63 | 0.56 | 0.49 | 1.281 | 1.266 | 75.3 |
| 0.5% CaCO₃ | White (0.5% TiO₂) | 0.56 | 0.52 | 0.49 | 1.279 | 1.270 | 11.4 |
| 0.5% SrCO₃ | White (0.5% TiO₂) | 0.42 | 0.39 | 0.38 | 1.277 | 1.259 | 11.6 |
| 0.5% BaCO₃ | White (0.5% TiO₂) | 0.54 | 0.48 | 0.46 | 1.280 | 1.283 | 12.1 |
| 0.2% BaCO₃ | White (0.5% TiO₂) | 0.67 | 0.53 | 0.5 | 1.281 | 1.273 | 13.8 |
| 0.2% diisodecyl pentaerythrityl diphosphite | White (0.5% TiO₂) | 0.56 | 0.51 | 0.51 | 1.280 | 1.262 | 14.0 |
| 0.2% phenylneopentyl phosphite | White (0.5% TiO₂) | 0.56 | 0.55 | 0.55 | 1.285 | 1.258 | 16.5 |
| None | White (0.5% TiO₂) | 0.67 | 0.5 | 0.5 | 1.282 | 1.264 | 12.7 |

T.W. = Translucent White

TABLE V
PHYSICAL PROPERTIES OF FLAME RESISTANT POLYCARBONATE POLYMERS AT DIFFERENT TEMPERATURES

A) With 0.5% TiO₂, 0.5% BaCO₃ and 0.2% Diisodecyl pentaerythrityl diphosphite
B) With 0.5% TiO₂

| Temperature | 300° C. | | 320° C. | | 340° C. | |
|---|---|---|---|---|---|---|
| | A | B | A | B | A | B |
| Relative Viscosities | | | | | | |
| Pellet | 1.282 | 1.284 | 1.282 | 1.284 | 1.282 | Material no longer processable |
| Molded Part | 1.278 | 1.270 | 1.277 | 1.266 | 1.266 | |
| Izod Impact cmkp/cm₂ | 18.9 | 19.0 | 18.1 | 18.0 | 13.4 | |
| Elongation % | 86 | 88 | 80 | 79 | 76 | |
| Spectral Color Densities P꜀ (remission) | 8.3 | 16 | 8.8 | 18 | 9.2 | |
| Burn Test | 35 sec | 25 sec | 35 sec | 20 sec | 40 sec | |
| Reference standard 0° C. | | | | | | |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A polycarbonate composition comprising in admixture an aromatic polycarbonate of a dihydric phenol and a carbonate precursor and 0.01 to about 5.0 weight percent, based on the total weight of the polycarbonate composition, of an alkaline earth carbonate selected from the group consisting of barium carbonate, strontium carbonate, and calcium carbonate; said aromatic polycarbonate being selected from the group consisting of (a) a polycarbonate of a halogen substituted dihydric phenol, (b) a copolycarbonate of an unsubstituted dihydric phenol and a halogen substituted dihydric phenol, (c) mixtures of (a) and (b) and (d) mixtures of a member selected from the group consisting of (a) and (b) with a polycarbonate of an unsubstituted dihydric phenol; said halogen being selected from the group consisting of bromine and chlorine and being a substituent on the aromatic hydroxyl bearing phenyl moiety.

2. The composition of claim 1 wherein the aromatic polycarbonate is a mixture of a polycarbonate of a dihydric phenol and a copolycarbonate of a dihydric phenol and a tetrahalogenated dihydric phenol said halogen being selected from the group consisting of bromine and chlorine.

3. The composition of claim 1 wherein the aromatic polycarbonate is a copolycarbonate of bisphenol-A and tetrabromo bisphenol-A.

4. The composition of claim 1 wherein the aromatic polycarbonate is a polycarbonate of tetrabromo bisphenol-A.

5. The composition of claim 1 wherein the alkaline earth carbonate is barium carbonate.

6. The composition of claim 1 wherein the halogen is chlorine.

7. The composition of claim 6 wherein the aromatic polycarbonate is a mixture of polycarbonate of a dihydric phenol and a copolycarbonate of a dihydric phenol and a tetrachlorinated dihydric phenol.

8. The composition of claim 7 wherein the dihydric phenol is 2,2-bis(4-hydroxyphenyl)-propane and the tetrachlorinated phenol is 2,2-bis(3,5-dichloro-4-hydroxyphenyl)-propane.

9. The composition of claim 1 wherein the halogen is bromine.

10. The composition of claim 9 wherein the aromatic polycarbonate is a mixture of polycarbonate of a dihydric phenol and a copolycarbonate of a tetrabrominated dihydric phenol and a dihydric phenol.

11. The composition of claim 10 wherein the dihydric phenol is 2,2-bis(4-hydroxyphenyl)-propane and the tetrabrominated dihydric phenol is 2,2-(3,5-dibromo-4-hydroxyphenyl)-propane.

12. A polycarbonate composition comprising a mixture of the polycarbonate homopolymer of 2,2-bis(4-hydroxyphenyl)-propane and the polycarbonate copolymer of 2,2-bis(4-hydroxyphenyl)-propane and 2,2-bis(3,5-dibromo-4-hydroxyphenyl)-propane, said mixture containing 0.01 to 5 weight percent, based on the weight of polycarbonate, of barium carbonate.

* * * * *